United States Patent
Hardcastle et al.

(10) Patent No.: US 6,776,936 B2
(45) Date of Patent: *Aug. 17, 2004

(54) PROCESS FOR MAKING POROUS GRAPHITE AND ARTICLES PRODUCED THEREFROM

(75) Inventors: Leland A. Hardcastle, Decatur, TX (US); Rex G. Sheppard, Decatur, TX (US); David F. Dingus, Decatur, TX (US)

(73) Assignee: Poco Graphite, Inc., Decatur, TX (US)

(*) Notice: Subject to any disclaimer, the term of this patent is extended or adjusted under 35 U.S.C. 154(b) by 222 days.

This patent is subject to a terminal disclaimer.

(21) Appl. No.: 09/925,766

(22) Filed: Aug. 9, 2001

(65) Prior Publication Data

US 2003/0034575 A1 Feb. 20, 2003

(51) Int. Cl.$^7$ ............................................ C01B 31/00
(52) U.S. Cl. ................. 264/29.1; 264/29.6; 264/42; 423/445; 423/448
(58) Field of Search ............................. 264/29.1, 29.6, 264/42; 423/445, 448

(56) References Cited

U.S. PATENT DOCUMENTS

| | | | |
|---|---|---|---|
| 3,857,913 A | * 12/1974 | Crow et al. ............... | 264/29.1 |
| 4,024,226 A | * 5/1977 | Lersmacher et al. ..... | 423/445 R |
| 4,756,898 A | * 7/1988 | Hopper et al. .......... | 423/445 R |
| 4,832,881 A | * 5/1989 | Arnold et al. ............ | 264/29.7 |
| 4,894,215 A | * 1/1990 | Kawakubo et al. ....... | 423/449.6 |
| 5,298,068 A | * 3/1994 | Giesemann ................ | 106/604 |
| 5,945,084 A | * 8/1999 | Droege .................... | 423/447.4 |
| 6,576,168 B2 | * 6/2003 | Hardcastle et al. ........ | 264/29.1 |

* cited by examiner

Primary Examiner—Allan R. Kuhns
(74) Attorney, Agent, or Firm—Bracewell & Patterson, L.L.P.

(57) ABSTRACT

A process for producing solid, porous graphites which provides a more uniform density gradient throughout the ultimate product. The process utilizes a pressure drop during processing in order to induce boiling and varies the processing pressure between an initial pressure which exceeds 1000 psig and a final processing pressure which generally exceeds the initial pressure. The particular processing techniques employed allow additional viscosity manipulation as well as improved density gradient characteristics in the ultimate product. The final products have bulk thermal conductivities in the range from 90–300 W/mK with apparent densities ranging from about 0.678 g/cc–1.5 g/cc

22 Claims, 1 Drawing Sheet

PROCESS FOR MAKING POROUS GRAPHITE AND ARTICLES PRODUCED THEREFROM

BACKGROUND OF THE INVENTION

1. Field of the Invention

The present invention relates generally to a process for the manufacture of porous solids and, more specifically, to a process for the manufacture of solid, high thermally conductive porous graphite artifacts and to improvements in the manufacturing process to enhance the properties of the artifacts so formed.

2. Description of the Prior Art

This invention deals with carbon in its various forms and, particularly to artifacts formed of solid, porous graphite. Carbon fibers have been used commercially in industry for many years. Carbon fibers are known to exhibit extraordinary mechanical properties due to the unique graphitic morphology of the extruded filaments. Advanced structural composites have been created which advantageously exploit these properties by creating a disconnected network of graphitic filaments held together by an appropriate matrix.

Additionally, many of the current applications of carbon fibers have evolved from structural reinforcement applications to thermal or heat sink applications. For example, heat sinks have been utilized in the aerospace industry to absorb energy in applications such as missiles and aircraft where rapid heat generation is found. A number of heat absorption applications are also envisioned for the automotive industry.

These and other applications have stimulated research into novel reinforcements and composite processing methods for carbon materials. Acceptable materials must exhibit high thermal conductivity, low weight and a low coefficient of thermal expansion, among other requisite properties.

POCO Graphite, Inc., of Decatur, Tex., assignee of the present invention, has previously produced a line of specialty graphite materials that are routinely used in a wide range of highly technical and industrial applications. The following grades of porous graphites have been produced:

| Grade: | ZXF-5Q | ACF-10Q | AXF-5Q | AXM-5Q | AXZ-5Q | TM | XT | FC |
|---|---|---|---|---|---|---|---|---|
| Typical Apparent Density (g/cc): | 1.78 | 1.77 | 1.78 | 1.73 | 1.66 | 1.82 | 1.71 | 1.43 |
| Thermal Conductivity (W/mK): | 70 | 60 | 95 | 88 | 70 | 105 | 110 | 68 |

These high strength, fine grained isotropic graphites are easily machined by conventional machining methods. Their high strengths and small particle sizes allow the fabrication of complex components containing tight tolerances. The isotropic nature of the materials provides uniform electrical and thermal properties.

In spite of these advantages, the bulk thermal conductivities of these porous solid graphites have generally been below about 100 W/mK with apparent densities of 1.9 g/cc and below. Efforts have been undertaken to produce porous graphite materials which exhibit even higher thermal conductivities in order to meet present and future commercial expectations.

Attempts have been made to improve upon the properties of solid graphite materials through the production of pitch based carbon "foam" materials. The apparent densities of such materials are lower than the apparent densities of the specialty graphites listed above. For the most part, the previously described prior art foam processes also resulted in foams which exhibited low thermal conductivities, generally less than about 58 W/mK.

One attempt to produce an improved carbon "foam" is described in now issued U.S. Pat. No. 6,033,506, issued Mar. 7, 2000 to Klett and in issued U.S. Pat. No. 6,037,032, issued Mar. 14, 2000, to Klett et al. The processes described in the Klett patents included steps which were less time consuming than the earlier known techniques for producing graphite foams and offered the potential to lower production and fabrication costs. Perhaps more importantly, the Klett process claimed to produce carbon foams with thermal conductivities, generally greater than 58 W/mK.

Although the Klett process was an improvement in pitch based carbon foaming processes, the Klett process utilized a static pressure during the formation of the green artifact (billet). Routinely, this static pressure selected was about 1000 psig. Graphite foams made in this manner have shown significant density gradients, generally ranging from about 0.25 g/cc at the top of a production billet to about 0.60 g/cc at the bottom of the billet and have exhibited voids and cracks. The claimed thermal conductivities have also not been achieved in some instances.

Applicant's own improvements to the original Klett process, described in co-pending application Ser. No. 09/862,560, filed May 22, 2001, entitled "Process For Making Carbon Foam Induced By Process Depressurization", use a "flash" method to induce boiling of the pitch precursor and produce porous graphite "foams" which have apparent densities ranging between 0.40–0.65 g/cc and thermal conductivities exceeding 58 W/mK without exhibiting voids or cracks as in the initial Klett process.

A need continues to exist for graphite artifacts having even higher thermal conductivities, for example greater than 70 W/mK. A need thus exists for a solid, high thermally conductive porous graphite with an apparent density which exceeds that of the previously described graphite foams and with thermal conductivity characteristics greater than 70 W/mK.

A need exists for an improved method for producing artifacts having these characteristics which artifacts are substantially free of density gradients, voids and cracks.

SUMMARY OF THE INVENTION

It is one object of the present invention to provide a solid, high thermally conductive porous graphite which has a more uniform density gradient profile with less tendency to crack as a finished product as compared to the prior art.

Another object of the invention is to provide such a solid, porous graphite with an apparent density greater than about 0.678 g/cc.

Another object of the invention is to provide such a solid, porous graphite which has a thermal conductivity greater than 70 W/mK.

In a specifically preferred process of the invention for producing a porous graphite, pitch is introduced into a mold, the pitch having a characteristic boiling point at a given pressure and for a given temperature. Air is then purged from the mold. The pitch is then pressurized between a preselected initial processing pressure and a relatively lower final processing pressure. The preselected initial pressure serves to increase the boiling point of the pitch above the boiling point at the final processing pressure. The pitch is heated while at the initial processing pressure to a temperature below the solidification point but above the boiling point which typically occurs at the final processing pressure. The pitch is then depressurized from the initial processing pressure to the final processing pressure while maintaining the process temperature above the typical boiling temperature at the final pressure to thereby produce a porous artifact. The porous artifact is heated to a temperature that solidifies and cokes the porous artifact to form a solid, porous carbon. The solid, porous carbon artifact can then be cooled to room temperature with simultaneous release of pressure. The porous carbon artifact then undergoes additional heat treatments to produce a porous graphite artifact having a thermal conductivity greater than 70 W/mK and a density greater than graphite foam.

The preferred solid, porous graphite artifacts so produced have a thermal conductivity greater than 150 W/mK and a density greater than 0.678 g/cc. Artifacts having thermal conductivities greater than 150 W/mK have been produced having densities in the range from 0.678 g/cc and 1.5 g/cc.

Additional objects, features and advantages will be apparent in the written description which follows.

DETAILED DESCRIPTION OF THE INVENTION

Figure 1:
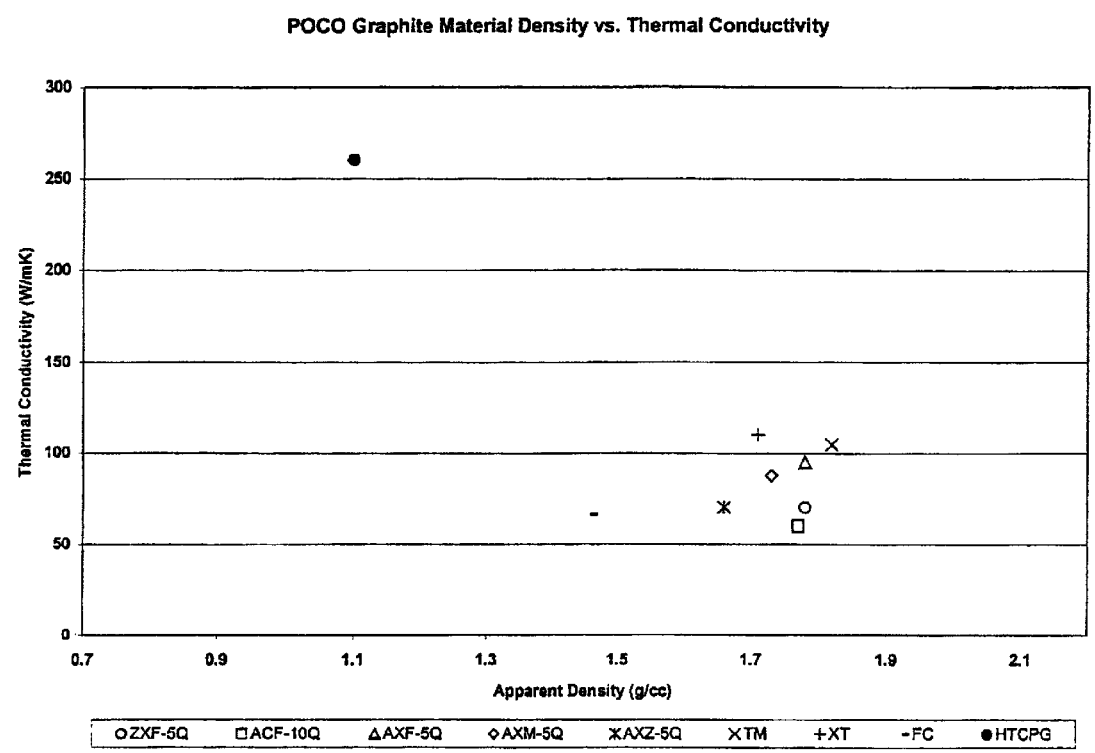
FIG. 1 a graph of thermal conductivity in W/mK versus apparent density in g/cc for several prior art porous graphite materials as compared to the solid, high thermally conductive porous graphite of the invention.

In the discussion which follows, it is important to distinguish between graphite "foams" and "solid, porous graphite materials." A "foam" will be defined herein to be a material having a relative density (RD) equal to or less than 0.3, i.e., being at least 70% porous. Using this definition, the artifacts prepared according to the method of the present invention have apparent densities greater than about 0.678 g/cc, relative densities greater than 0.3 and thus constitute "porous solids" rather than foams.

At a relative density (RD) above about 0.3, there is a transition from a cellular structure (foam) to one which is better thought of as a solid containing isolated pores (porous solid). RD can be defined as:

RD=$p°$/ps where $p°$=density of cellular material ps=density of the material making the solid cell walls (theoretical density)

See: "*Cellular Solids, Structure and Properties*, Second Edition, Page 2, Lorna J. Gibson, Dept. of Materials Science and Engineering, MIT, Cambridge, Mass. 021139, USA, Michael F. Ashby, Dept. of Engineering, Cambridge, University, Cambridge, UK, Cambridge University Press, 40 W. $20^{th}$ Street, New York, N.Y., 1988.

For example, a graphite foam with an apparent density of 0.50 g/cc would have a RD=0.50/2.26=0.22 (where 0.5 g/cc is the density of the cellular material and 2.26 g/cc is the density of the graphite in the cell walls).

A sample with an apparent density of 0.678 g/cc would have a RD=0.678/2.26=0.3, therefore any material produced that has an apparent density greater than 0.678 g/cc will be a "solid" containing isolated pores according to the above definition. In the discussion of the invention which follows, reference will be made to both foams and solids, it being understood that the present invention is directed toward porous solids.

One problem with previously produced "foamed" products was the presence of density variations from the top to the bottom of the production billet. The density variations in the end products were found to occur between the foaming and solidification steps of the prior art process while the foamed pitch was still in the liquid state. The liquid pitch tends to migrate due to gravity, thereby making the bottom of the production billet denser than the top portion of the billet.

Applicant's previous application Ser. No. 09/862,560, concerned the discovery that, by heating the pitch under an increased pressure above 1000 psig, the process temperature can exceed the normal foaming point of the pitch without the pitch actually foaming, i.e., the thermal foaming point is raised. Holding the pitch at such a selected temperature allows the growth of mesophase domains within the pitch, thereby increasing the pitch's viscosity. Higher viscosities at this point in the process reduce the previously described migration problems.

The present invention concerns the discovery that the apparent density of artifacts of the above type can be manipulated to produce "solid" graphites by processing at final pressures greater than 1000 psi and manipulating the final "boiling pressure". As a result of the higher and variable processing pressures, the apparent densities of the end products have been increased to greater than 0.678 g/cc with thermal conductivities which exceed 150 W/mK.

FIG. 1 shows a graph of thermal conductivity in W/mK versus apparent density in g/cc for several of the POCO specialty graphites as compared to the solid, high thermally conductive porous graphite (HTCPG) of the invention. The thermal conductivity of the sample HTCPG in FIG. 1 exceeds 250 W/mK.

In the process of the invention, a solid, porous graphite is produced by first placing pitch powder, granules or pellets into a mold or container with the desired final shape of the artifact to be produced. The pitch can be selected from among the mesophase pitches, isotropic pitches and mixtures thereof. The mesophase pitches include, for example, synthetic pitches, coal based pitches and petroleum based pitches. These pitch materials can be solvated if desired. The pitches can be introduced in the granulated, powdered or pelletized form. One example precursor material is the Mitsubishi ARA-24 mesophase pitch. A proper mold release agent or film can be applied to the sides of the mold to allow removal of the part. Preferably, a suitable liner, such as an aluminum foil liner is utilized. If the mold is made from pure aluminum, typically no mold release agent is necessary since the molten pitch does not wet the aluminum and thus does not stick to the mold.

The pitch may be desiccated to assist in removing any residual moisture. Following desiccation, the pitch is processed in a substantially oxygen-free environment to avoid oxidation of the pitch materials during heating. Preferably, the pitch is placed in a "HIP" furnace which has been evacuated to less than two torr. The HIP vessel is pressurized to a high initial pressure, e.g., 8000 psig, which increases the boiling point higher than the boiling point at the final processing pressure. The pitch is then heated to a temperature approximately 50 to 100° C. above the softening point. For example, where Mitsubishi ARA-24 mesophase pitch is used, a temperature of 300° C. is sufficient. After holding the pitch at 300° C. for one hour, the pitch is heated from 300 to 450° C. and held at 450° C. for a predetermined amount of time to increase the viscosity of the liquid pitch.

The vessel is then depressurized from the initial processing pressure (8000 psig) to the final processing pressure, e.g., 2000 psig, while maintaining the temperature of the initial processing pressure. This depressurizing causes the liquid pitch to boil and generate porosity.

As will be explained in greater detail in the examples which follow, the boiling liquid is then heated to a temperature, e.g., 500° C., that solidifies the artifact in one or more steps. The temperature of the system can then be raised from 500° C. to 600° C., or to a temperature sufficient to coke the pitch (about 500–600° C.). This is performed at a rate no greater than about 5° C./min and preferably about 1° C./min. The final temperature is held at 600° C. for about 2 hours and then the furnace power is turned off and cooled to room temperature. During the cooling cycle, pressure is released gradually to atmospheric conditions. Any remaining pressure is released at a rate of about 30 psi per minute. The artifact is then separated from the mold.

The artifact can be post heat treated to temperatures above 2000° C. for conversion to graphitic structure, depending upon the pitch precursor. In general, mesophase pitch is graphitized significantly easier than isotropic pitches (coal derived or petroleum derived). The more graphitic the material, the higher the thermal conductivity of the resulting graphitic foam.

The specific steps followed in the process of the invention are summarized below:

1. A mold is filled with a pellet or powder form of mesophase pitch.
2. The pitch is then desiccated to assist in removing any residual moisture.
3. The pitch is placed into a Hot Isostatic Press (HIP).
4. The press is purged of air.
5. The pitch is pressurized to a high initial processing pressure, which increases the boiling point higher than the boiling point at the final processing pressure.
6. The pitch is heated to a temperature below the solidification point but above the liquid and boiling point which typically occurs if processed at the final processing pressure.
7. The pitch is depressurized from the initial processing pressure to the final processing pressure while maintaining the temperature which is above the pitch boiling point at the final processing pressure, thus producing a porous artifact.
8. The artifact is heated to a temperature that solidifies and cokes the porous artifact.
9. The artifact is cooled to room temperature while allowing natural depressurization during cooling.
10. The artifact is depressurized of any remaining pressure to atmospheric pressure.
11. The artifact is removed from the HIP and mold.
12. The artifact is then heat-treated to a sufficient temperature to completely carbonize the artifact.
13. The artifact is then heat-treated to a sufficient temperature to graphitize the artifact.

The process of the invention heats the pitch under an "increased pressure" which, in effect increases the thermal boiling point. That is, the process temperatures can exceed the "normal" boiling point of the pitch without the pitch actually boiling.

In the first example which follows, the HIP was pressurized to 8000 psi as the "initial processing pressure." This increased pressure will be understood to be an arbitrary number which could be anywhere in the range from about 4000 to 30,000 psig. In other words, assuming that a doubling of pressure generally increases boiling point by about 10° C., one could roughly estimate the boiling temperature of the pitch to be affected as follows:

| | |
|---|---|
| 1000 psi | 425° C. |
| 2000 psi | 435° C. |
| 4000 psi | 445° C. |
| 8000 psi | 455° C. |

Based upon this theoretical analysis, 8000 psi was selected as an acceptable "initial processing pressure" to achieve the desired pressurization induced boiling effect.

The final processing pressure is also an arbitrary number which is generally in the range from about 1000 and 30,000 psig. As will be evident from the examples which follow the final processing pressure affects both the ultimate thermal conductivity and apparent density of the finished artifact. By employing final processing pressures which are greater than about 1000 psig, apparent densities are increased above 0.70 g/cc and thermal conductivities exceed 250 W/mK.

The following examples are intended to be illustrative of the process steps of the invention without being limiting:

EXAMPLE I

1. The mold is filled with a predetermined amount of pitch to give an appropriate foam height.
1.
2. The mold is placed in the HIP.
3. The HIP vessel is evacuated to <2 Torr with the vacuum being held for 15 minutes.
4. The vessel is pressurized to 8000 psig with nitrogen gas.
5. The pitch is heated from room temperature to 300° C. at a rate of 3.5° C. per minute.
6. The pitch is held at 300° C. for 1 hour.
7. The pitch is heated from 300 to 450° C. at a rate of 2.0° C. per minute.
8. The pitch is held at 450° C. for 1 hour. (This increases the viscosity of the liquid pitch).
9. The vessel is depressurized from 8000 to 2000 psig at a rate of 175 psi per minute while maintaining a temperature of 450° C. (At this stage, the liquid pitch begins to boil and generate porosity.)
10. The artifact is heated from 450 to 475° C. at a rate of 2.0° C. per minute.
11. The artifact is held at 475° C. for 1 hour. (This is the point at which the artifact begins to set).
12. The artifact is heated from 475 to 500° C. at a rate of 0.5° C. per minute.
13. The artifact is held at 500° C. for 30 minutes. (At this point, the artifact fully solidifies).
14. The artifact is heated from 500 to 600° C. at a rate of 1.0° C. per minute. (This is the stage at which the artifact begins to coke.)
15. The artifact is held at 600° C. for 2 hours.
16. The artifact is cooled from 600° C. to room temperature at a rate of 2.0° C. per minute.
17. The vessel naturally depressurizes during cooldown from 600° C. to room temperature.
18. The remaining vessel pressure is released at a rate approximately 30 psi per minute.

19. The artifact is removed from the HIP and its mold.
20. The artifact is then heat treated to approximately 1000° C. for carbonization.
21. The artifact is then heat treated to approximately 2800° C. for graphitization.

Results: Thermal Conductivity ranged from 131–207 W/mK. Apparent Density ranged from 0.70–0.74 g/cc.

EXAMPLE II
Same as Example I except:
9. The vessel is depressurized from 8000 psi to 3000 psi at a rate of 175 psi per minute while maintaining a temperature of 450° C.

Results: Thermal Conductivity ranged from 180–247 W/mK. Apparent Density ranged from 0.84–0.85 g/cc.

EXAMPLE III
Same as Example I except:
9. The vessel pressure is held at 8000 psig while maintaining a temperature of 450° C.
Apparent Density was 1.10 g/cc.

EXAMPLE IV
Same as Example I except:

8. The pitch is held at 450° C. for 1.5 hours.
9. The vessel is depressurized from 8000 psig to 2800 psig at a rate of 260 psi per minute while maintaining a temperature of 450° C.

Results: Thermal conductivity ranged from 222–295 W/mK. Apparent density ranged from 0.88–0.90 g/cc.

An invention has been provided with several advantages. The process of the invention results in solid, high thermally conductive porous graphites having more uniform density gradient properties. The increased viscosity of the pitch during the processing operation reduces pore/bubble sizes within the ultimate porous artifact. Manipulation of the final process temperature allows greater control over pore size. Additionally, changing the hold times and temperature along with the various upper and lower pressure limits allows the production of a wider variety of porous graphite products. The porous solid graphites of the invention exhibit thermal conductivities which exceed 70 W/mK, and generally range from about 90–300 W/mK with apparent densities ranging from about 0.678 g/cc–1.5 g/cc.

While the invention has been shown in only one of its forms, it is not thus limited, but is susceptible to various changes and modifications without departing the sprit thereof.

What is claimed is:

1. A method of producing porous graphite, comprising the steps of:
   introducing pitch into a mold, the pitch having a characteristic boiling point at a given pressure and for a given temperature;
   purging air from the mold;
   pressurizing the pitch between a preselected initial processing pressure and a relatively lower final processing pressure, the preselected initial pressure serving to increase the boiling point of the pitch above the boiling point at the final processing pressure;
   heating the pitch while at the initial processing pressure to a temperature below the solidification point but above the boiling point which typically occurs at the final processing pressure;
   depressurizing the pitch from the initial processing pressure to the final processing pressure while maintaining the process temperature above the typical boiling temperature at the final pressure to thereby produce a porous artifact;
   heating the porous artifact to a temperature that solidifies and cokes the porous artifact to form a solid, porous carbon; and
   cooling the solid, porous carbon artifact to room temperature with a simultaneous release of pressure
   heating the solid, porous carbon to a temperature between 900° C. and 1100° C. to completely carbonize the artifact; and
   heating the solid porous carbon artifact to a temperature between 2500° C. and 3200° C. to graphitize the artifact thus producing a porous graphite artifact.

2. The method of claim 1, wherein the pitch introduced into the mold is selected from the group consisting of granulated pitches, powdered pitches and pelletized pitches.

3. The method of claim 1, wherein the pitch is selected from the group consisting of mesophase and isotropic pitches and mixtures thereof.

4. The method of claim 3, wherein the pitch is a mesophase pitch selected from the group consisting of synthetic pitches, coal based pitches, petroleum based pitches and mixtures thereof.

5. The method of claim 1, wherein the initial processing pressure is greater than 1000 psi.

6. The method of claim 1, wherein the initial processing pressure is more than twice the final processing pressure.

7. The method of claim 1, wherein the final processing pressure is greater than 1000 psi.

8. A method of producing solid, high thermally conductive porous graphite, comprising the steps of:
   introducing pitch into a mold, the pitch having a characteristic boiling point at a given pressure and for a given temperature;
   purging air from the mold;
   pressurizing the pitch between a preselected initial processing pressure and a relatively lower final processing pressure, the preselected initial pressure serving to increase the boiling point of the pitch above the boiling point at the final processing pressure;
   heating the pitch while at the initial processing pressure to a temperature below the solidification point but above the boiling point which typically occurs at the final processing pressure;
   depressurizing the pitch from the initial processing pressure to the final processing pressure while maintaining the process temperature above the typical boiling temperature at the final pressure to thereby produce a porous artifact;
   heating the porous artifact to a temperature that solidifies and cokes the porous artifact to form a solid, porous carbon; and
   cooling the solid, porous carbon artifact to room temperature with simultaneous release of pressure; heating the solid, porous carbon to a temperature between 900° C. and 1100° C. to completely carbonize the artifact; and
   heating the solid porous artifact to a temperature between 2500° C. and 3200° C. to graphitize the artifact thus producing a porous graphite artifact having a thermal conductivity greater than about 150 W/mK and a density greater than foam.

9. The method of claim 8, wherein the initial processing pressure is greater than 1000 psi.

10. The method of claim 8, wherein the initial processing pressure is more than twice the final processing pressure.

11. The method of claim 8, wherein the final processing pressure is greater than 1000 psi.

12. The method of claim 8, wherein the initial processing pressure is selected to be at least 8000 psi.

13. The method of claim 8, wherein the final processing pressure is selected to be at least 2000 psi.

14. The method of claim 8, wherein the porous graphite artifact so produced has a density greater than 0.678 g/cc.

15. The method of claim 8, wherein the porous graphite artifact so produced has a thermal conductivity greater than 200 W/mK.

16. The method of claim 8, wherein the mold is pressurized in a vessel to an initial pressure between 4,000 to 30,000 psig with an inert gas.

17. The method of claim 16, wherein the pitch within the mold is heated from room temperature to a melting temperature between 250 and 350° C. at a rate between 1.0 and 10.0° C. per minute.

18. The method of claim 17, wherein the pitch is then held between 250 and 450° C. for up to 4 hours.

19. The method of claim 18, wherein the vessel is depressurized from the initial processing pressure to the final processing pressure at a rate between 50 and 700 psig per minute while maintaining the pre-depressurization temperature.

20. The method of claim 19, wherein, after depressurization, the porous artifact is heated from the pre-depressurization temperature to a temperature between 400 and 800° C. at a rate between 1.0 and 10.0° C. per minute.

21. The method of claim 20, wherein the artifact is held between 400 and 800° C. for up to 4 hours.

22. The method of claim 21, wherein the artifact is cooled from between 400 and 800° C. to room temperature at a rate between 1.0 and 30° C. per minute.

* * * * *